UNITED STATES PATENT OFFICE.

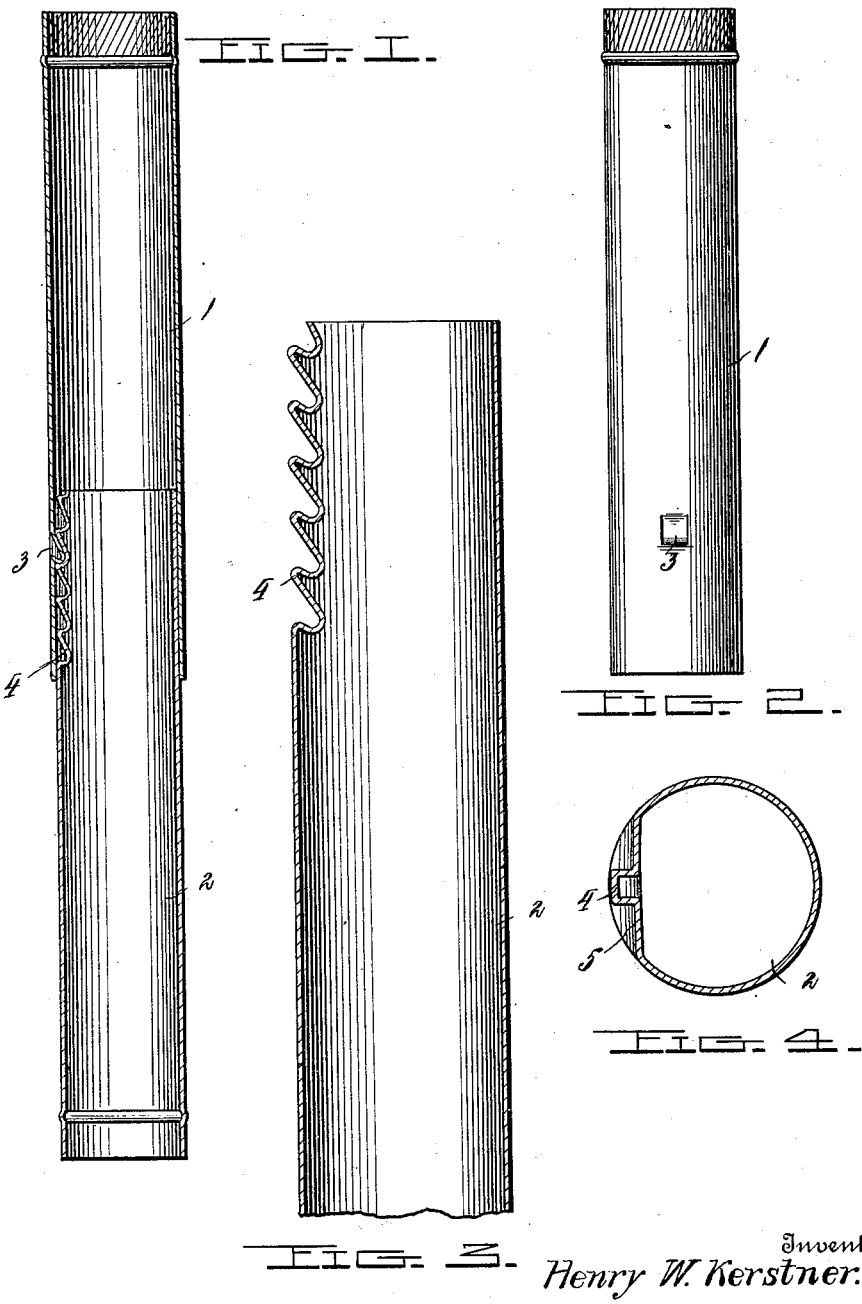

HENRY W. KERSTNER, OF DEXTER, MISSOURI.

STOVEPIPE.

1,095,884. Specification of Letters Patent. Patented May 5, 1914.

Application filed September 6, 1911. Serial No. 647,848.

*To all whom it may concern:*

Be it known that I, HENRY W. KERSTNER, a citizen of the United States, residing at Dexter, in the county of Stoddard and State of Missouri, have invented new and useful Improvements in Stovepipes, of which the following is a specification.

This invention relates to improvements in stove pipes.

In carrying out my invention it is my purpose to provide a joint for stove pipes or the like wherein the adjacent ends of the stove pipe sections may be readily adjusted, one within the other, and effectively retained in said adjusted position.

With the above object, and others of a similar nature in view, the invention resides in the novel construction and arrangement of parts hereinafter fully described and claimed.

In the accompanying drawings,—Figure 1 is a vertical longitudinal sectional view of a pair of pipe sections connected in accordance with the present invention. Fig. 2 is a side elevation of one of the pipe sections. Fig. 3 is an enlarged vertical longitudinal sectional view of the second pipe joint. Fig. 4 is a horizontal sectional view of the same.

In the drawings 1 and 2 designate a pair of telescopic stove pipe sections. The section 1 is provided upon its inner face with a tooth 3. The section 2 is formed upon its outer side with a flat face 5 and a line of teeth 4 extending longitudinally between the side edges of the said flat face. The outer ends of these teeth are in line with the side of the pipe section below the teeth. When the pipe sections are to be adjustably connected, the section 2 is inserted, longitudinally, within the section 1, provided with the tooth 3. The section 2 is so arranged that the tooth 3 of the section 1 will ride over the flat face 5 adjacent the line of teeth 4 of the section 2. When a proper adjustment is reached one or both of the sections is partly rotated to bring the tooth 3 into engagement with one of the teeth 4. This securely retains the pipe sections locked in an adjusted position. To separate the sections, it is merely necessary to further rotate one or both of the said sections to bring the tooth 3 out of engagement with one of the teeth 4, and a pull in a longitudinal direction will readily cause the separation of the sections.

Having thus described the invention, what I claim is:—

A stove pipe joint, comprising a pair of telescopic stove pipe sections, one of said sections being formed on its inner side with a tooth, and the other section being formed on the outer side with a flat face, and a line of teeth extending longitudinally between the side edges of the said flat face, the outer ends of said teeth being in line with the side of the pipe section below them, the tooth of one section being adapted to move over said flat face, when the pipe sections are connected together, and to engage with one of the teeth of the other section.

In testimony whereof I affix my signature in presence of two witnesses.

HENRY W. KERSTNER.

Witnesses:
SAM WILLIAMS,
W. K. KIGHT.